Sept. 15, 1959 I. F. FAUSEK ET AL 2,904,060
VALVE SEAT STRUCTURES
Filed Oct. 24, 1955 2 Sheets-Sheet 2

INVENTORS
IRWIN. F. FAUSEK
WILLIS L. REEDY
BY *Em Harrington* ATT'Y.

2,904,060

VALVE SEAT STRUCTURES

Irwing F. Fausek, Clayton, and Willis L. Reedy, St. Louis, Mo., assignors to Modern Engineering Company, St. Louis, Mo., a corporation of Missouri Application October 24, 1955, Serial No. 542,141

2 Claims. (Cl. 137—329.04)

This invention relates generally to valve seat structures which are intended particularly, though not exclusively, for use as parts of pressure regulators, and more specifically to such seat structures which comprise a block provided with a multiplicity of recesses each one of which receives a valve seat, the predominant object of the invention being to provide a seat structure which is so made that all of the seats are joined together in an integral manner so that there will be very little likelihood that any one or more of said seats will become loose within their recess, due to shrinkage of the material from which they are made, or for any other reason, as might be the case if the various seats were independent of and distinct from each other, as was formerly the situation.

Figure 1:
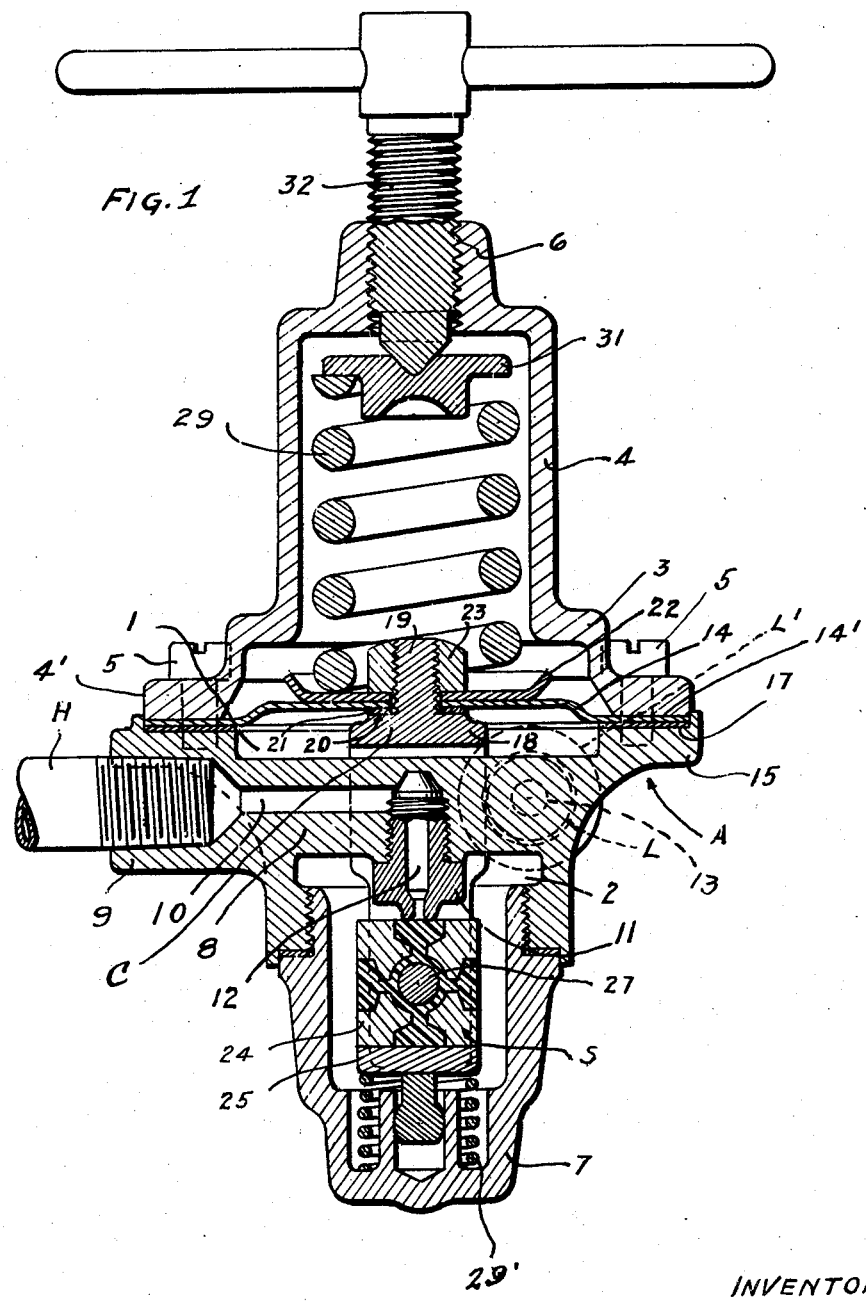
Fig. 1 is a view partly in side elevation and partly in vertical section of a pressure regulator provided with the improved seat structure of this invention.

While the improved seat structure S of this invention is not intended exclusively for use as a part of a pressure regulator, we illustrate in Fig. 1 of the drawing a pressure regulator with which the improved seat structure is shown as an assembled part, this showing illustrating one use merely to which the improved seat structure S may be put. The pressure regulator of Fig. 1 comprises a body portion A which is provided with a diaphragm chamber 1. The lower portion of the cavity within the valve housing A constitutes a valve chamber 2, said diaphragm chamber and said valve chamber being in direct communication with each other. Secured to the valve housing A at a point immediately above the diaphragm chamber 1 is a diaphragm cover 3, which is provide with an upwardly extending hollow bonnet portion 4 and is secured by means of bolts or other fastening devices 5 to the housing A. Formed in the top wall of the upwardly extending bonnet portion 4 of the diaphragm cover is an internally threaded opening 6 which is intended for a purpose to be hereinafter set forth. 7 designates a cap having an externally threaded portion which is screwed into the valve chamber 2, said cap functioning as a closure member for the lower end of said valve chamber. Arranged transversely of the cavity within the housing A at a point immediately below the diaphragm chamber 1 is a bridge member 8. The bridge member 8 is not a solid wall separating the diaphragm chamber 1 from the valve chamber 2, as might appear from Fig. 1, but is an integral bar, the side faces of which are spaced apart from the wall of the housing so as to provide a space on either side of said bridge member.

H designates a high pressure conducting member screwed into a socket 9 and communicating with an inlet passageway 10 formed in the bridge member 8. A valve seat member 11 screwed into the bridge member 8 is provided with a passageway 12 which formed a continuation of the inlet passageway 10 leading to the valve chamber 2. A low pressure conducting pipe L screwed into a socket L' communicates with a discharge passageway formed in the wall of the valve housing A, said discharge passageway communicating with the diaphragm chamber 1.

14 designates a diaphragm arranged in the diaphragm chamber 1, said diaphragm being arranged to rest upon an annular flange 15 extending upwardly from the top face of the valve housing A. Located between the portion 14' of the diaphragm 14 and the base of the depression in which it is located is a gasket 17 to prevent the escape of fluid at the marginal edge of said diaphragm. To securely anchor the marginal edge portion of the diaphragm and the gasket 17 in place, said marginal edge portion of said diaphragm and said gasket are interposed between the top wall of the valve housing A and the flange 4' of the diaphragm cover 3, and the threaded shanks of the bolts 5 pass through apertures in said diaphragm portion and said gasket. It is apparent that when the bolts 5 are screwed downwardly as far as they will go a fluid-tight joint will be obtained between the valve housing, diaphragm, gasket, and diaphragm cover. C designates a closure member which is arranged partly within the valve chamber 2 and partly within the diaphragm member 1, said closure member preferably comprising a U-shaped member 18 which straddles the bridge member 8. The U-shaped member is provided with a threaded stem 19 at its upper end which passes through the diaphragm 14, and said member 18 is provided with a shoulder 20. Interposed between the shoulder 20 and the lower face of the diaphragm is a gasket 21. Located above the diaphragm 14 and in contact with the top face thereof is a disk 22 which is provided with a central opening through which the threaded stem of the U-shaped member 18 passes, and arranged above the disk 22 on the threaded stem 19 is a nut 23. From the disclosure illustrated in Fig. 1 it is plain that when the nut 23 is screwed downwardly on the threaded stem 19 as far as it will go the disk 22, diaphragm 14 and gasket 21 will be clamped between said nut and the shoulder 20, and consequently if the diaphragm were deflected the U-shaped member 18 would move with said diaphragm. The closure member also includes a valve seat block 24 at the lower end of the U-shaped member 18, and said block 24 is secured to the legs of the U-shaped member 18 by means of a bolt 27 which passes through the legs of said U-shaped member 18 and through said block 24. From the foregoing it is apparent that the block 24 is very securely fixed to the U-shaped member 18.

The valve block 24 is very frequently thrown into engagement with the valve seat 11, and this block is also subjected to the action of the fluid under high pressure escaping from said member 11, consequently the portion of the valve seat which engages the valve seat member soon becomes worn or mutilated. To avoid the necessity of renewing or refinishing the block 24 it is preferably provided with a plurality of seats any one of which may be arranged in position to close the valve seat member 11. In adjusting the block 24 the cap 7 is removed from the valve housing, and the bolt 27 is withdrawn from its position. This will permit the block 24 to be turned to the desired position, after which the parts are reassembled.

Arranged within the portion 4 of the diaphragm cover 3 is a coil spring 29, said coil spring being interposed between the disk 22 supported by the threaded stem 19 of the U-shaped member 18 and a spring seat 31 at the upper end of said spring. Arranged within the internally threaded opening 6 in the top wall of the diaphragm cover 3 is a hand-operated screw 32, the lower end of which contacts with the spring seat 31. The screw 32 is provided with a tapered lower end portion which contacts with the walls of a tapered depression in the spring seat 31 whereby said spring seat 31 may also be properly alined with respect to the spring 29.

The spring 29 tends to force the block 24 away from the valve seat member 11, and the fluid pressure in the diaphragm chamber tends to force said block into engagement with said valve seat member. Fluid passing from the high pressure member H flows through the inlet passageway 10 through the ported valve seat member 11 and into the valve chamber 2, from which it escapes to the diaphragm chamber by passing upwardly on either side of the bridge member 8. The fluid escapes from the diaphragm chamber through the discharge passageway 13 which communicates with the low pressure pipe L. When the pressure in the diaphragm chamber rises to a predetermined degree, the diaphragm is deflected with the result of compressing the spring 29 and moving the block 24 into engagement with the flat bottom face of the ported valve seat member 11. This closes communication between the inlet and discharge passageways, and when the pressure drops to a predetermined degree the block 24 recedes in response to the pressure of the spring 29. The pressure of the spring 29 is opposed by the fluid pressure on the diaphragm and the head reciprocates in response to these counter-acting pressures so that the pressure in the low pressure pipe is maintained at a predetermined degree. The downward movement of the block 24 is resisted by the light spring 29' which serves as a shock absorber and insures contact between the block 24 and the valve seat member 11, when the pressure of the spring 29 has been greatly reduced by the hand-operated screw 32 being unscrewed. A spring seat 25, which is kept centered by guide pin 40 disposed for vertical movement within cavity 41 of cap 7, is interposed between spring 29' and block 24 to assure proper seating of block 24.

Figure 2:
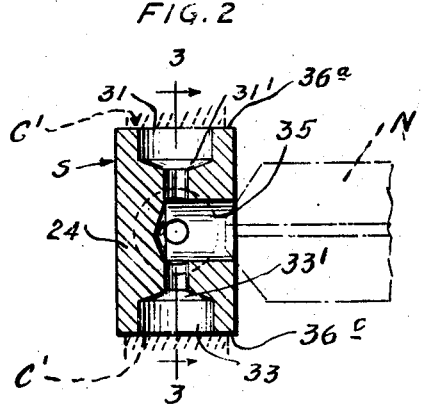
Fig. 2 is a vertical section taken through the block of the seat structure of this invention before the filler material has been introduced therein.
Figure 3:
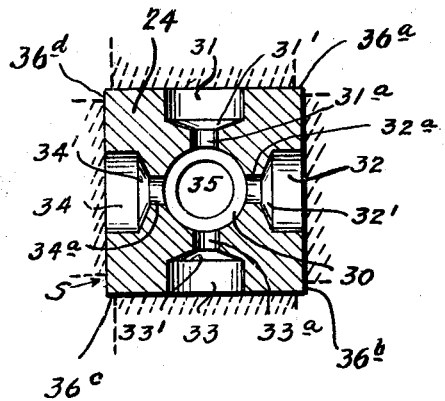
Fig. 3 is a section taken on line 3—3 of Fig. 2.

The present invention has to do particularly with the valve seat block 24, and as shown in Figs. 2 and 3 said valve seat block is provided with a central annular cavity 30, and also said block is provided with a plurality of valve seat cavities, in the embodiment shown there being four of such valve seat cavities numbered 31, 32, 33 and 34, though obviously a lesser or greater number of said valve seat cavities may be used. As shown in Figs. 2 and 3 the valve seat block 24 is rectangular in shape and one of the valve seat cavities is open at each of the outer faces thereof. The bottoms of the valve seat cavities are of tapered formation, as shown at 31', 32', 33', and 34' in Figs. 2 and 3, and leading into the tapered bottom portions of the respective valve seat cavities are passageways 31$^a$, 32$^a$, 33$^a$, and 34$^a$ which communicate with the central, annular cavity of the block at ends opposite to the end thereof which communicates with the valve seat cavities. A passageway 35 is extended transversely of the seat block 24, said transverse passageway being open at its outer end at an outer face of the seat block, and communicating at its inner end with the annular cavity 30 (Fig. 2). By referring to Fig. 2 it will be noted that the portion of the seat block at the side of the annular cavity which is opposite to the side thereof at which the transverse passageway 35 appears is initially solid.

In order to complete the production of the seat block 24, a seat block which is in the condition shown in Figs. 2 and 3 is arranged in a suitable clamping device which is provided with smooth faces C' that contact closely with the faces 36$^a$, 36$^b$, 36$^c$, and 36$^d$ of the seat block that is clamped thereby, the smooth faces of the clamping device closing the outer ends of the seat cavities 31, 32, 33 and 34. A nozzle N is arranged as shown in Fig. 2 with respect to the transverse passageway 35, and material is forced under pressure into and through the passageway 35, into and through the passageways 31$^a$, 32$^a$, 33$^a$, and 34$^a$, and into the seat cavities 31, 32, 33, and 34, the material filling all of said cavities completely, and the smooth faces C' of the clamping device providing the valve seats 31$^c$, 32$^c$, 33$^c$, and 34$^c$ in the seat cavities 31, 32, 33, and 34 with smooth outer faces. The material which fills the cavities of the seat block may be any suitable material, plastic, for instance, though obviously it may be rubber or metal, or any other material which can be caused to flow. When the filler material has cooled and come to a set, the transverse passageway 35 is extended entirley through the entire seat block by drilling, and through the filler material in the central, annular cavity as shown in Fig. 4, the additional length of the transverse passageway being designated 35$^a$ and the passageway formed through the filler material in the annular cavity 30 being designated 35$^b$.

Figure 4:
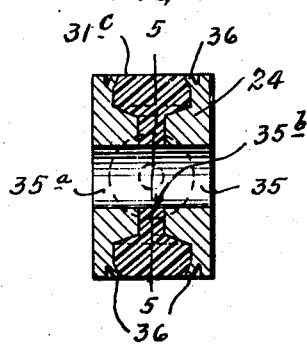
Fig. 4 is a view similar to Fig. 2 but after the filler material has been injected thereinto.
Figure 5:
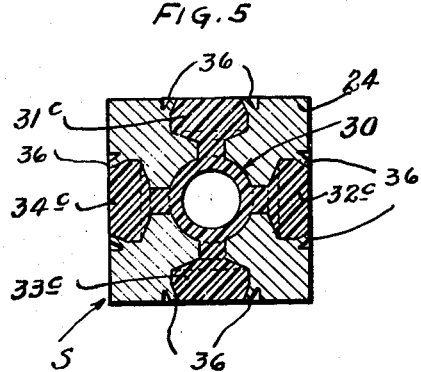
Fig. 5 is a section taken on line 5—5 of Fig. 4.

By referring to Figs. 4 and 5 it will be noted that the four valve seats 31$^c$, 32$^c$, 33$^c$, and 34$^c$ form parts of and are tied together by an integral, elaborate filling structure, hence there is very little likelihood that because of shrinkage or for other reasons they will become loose in their cavities. Furthermore, the integral filling structure also forms a bushing for the shaft 27, so that any strain imposed against the valve seats is transmitted directly to the supporting shaft 27. Misalignment of the valve seat block due to the elasticity of the filler material is prevented due to the fact that the shaft 27 is directly journalled in the metallic portion of valve seat block S through half of the block's thickness. However if it is desired to make positive that there will be no movement of said valve seats within their cavities, portions 36 of the material of which the valve seat block is formed, which are located adjacent to the valve seats, may be crimped over against the valve seats. This crimping operation may be performed with the aid of a circular punch and the crimps preferably are formed so that one surrounds each valve seat and so that the crimped over material engages the valve seats as shown in Figs. 4 and 5 and prevents movement thereof.

We claim:
1. A valve seat structure comprising a valve seat block, a plurality of valve seat cavities formed in said valve seat block, a valve seat disposed in each of said valve seat cavities, a mounting member extending centrally through said valve seat block, and means for tying said valve seats together so that they form parts of an integral structure, said means including a central portion embracingly supporting at least a portion of said mounting member.

2. A valve seat structure comprising a valve seat block, a plurality of valve seat cavities formed in said valve seat block and disposed generally in a common plane, a valve seat disposed in each of said valve seat cavities, a mounting member extending centrally through said valve seat block in a direction perpendicular to said plane, and means extending generally in said plane for tying said valve seats together so that they form parts of an integral structure, said means including a central portion embracingly supporting at least a portion of said mounting member and parts extending from said central portion to said valve seats.

References Cited in the file of this patent
UNITED STATES PATENTS

| | | |
|---|---|---|
| 501,713 | Gold | July 18, 1893 |
| 594,895 | O'Meara | Dec. 7, 1897 |
| 662,249 | Cadman | Nov. 20, 1900 |
| 1,638,010 | Fausek | Aug. 9, 1927 |
| 1,740,082 | Foerstner | Dec. 17, 1929 |
| 1,811,423 | Brundage | June 23, 1931 |
| 2,418,856 | Stacy | Apr. 15, 1947 |

OTHER REFERENCES

Plastics Engineering Handbook, 1954, Reinhold Publishing Corp. (pp. 54 and 58). (Copy in Div. 15.)